(12) United States Patent
Morales

(10) Patent No.: US 8,115,956 B2
(45) Date of Patent: Feb. 14, 2012

(54) ENHANCEMENTS TO VI RECORD JOB TICKETING AND PROCESSING

(75) Inventor: Javier A. Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 884 days.

(21) Appl. No.: 12/126,446

(22) Filed: May 23, 2008

(65) Prior Publication Data

US 2009/0290187 A1 Nov. 26, 2009

(51) Int. Cl.
*G06K 15/00* (2006.01)
*G06F 3/12* (2006.01)

(52) U.S. Cl. ...... 358/1.15; 358/1.9; 358/1.18; 358/1.14; 358/1.13; 715/209; 715/222; 715/226

(58) Field of Classification Search ................. 358/1.15, 358/1.18, 1.9, 1.14, 1.13; 715/209, 222, 715/226
See application file for complete search history.

(56) References Cited

U.S. PATENT DOCUMENTS

| | | | |
|---|---|---|---|
| 5,718,520 A * | 2/1998 | MacKay | 400/61 |
| 6,088,710 A * | 7/2000 | Dreyer et al. | 715/246 |
| 6,134,018 A * | 10/2000 | Dziesietnik et al. | 358/1.15 |
| 6,173,295 B1 * | 1/2001 | Goertz et al. | 715/209 |
| 6,236,463 B1 | 5/2001 | Cyman et al. | 358/1.14 |
| 6,332,149 B1 | 12/2001 | Warmus et al. | 707/517 |
| 6,446,100 B1 | 9/2002 | Warmus et al. | 707/517 |
| 6,844,940 B2 | 1/2005 | Warmus et al. | 358/1.18 |
| 7,027,175 B2 * | 4/2006 | Robertson | 358/1.15 |
| 7,125,179 B1 * | 10/2006 | Rai et al. | 400/62 |
| 7,274,479 B2 | 9/2007 | Gauthier | 358/1.15 |
| 7,278,094 B1 | 10/2007 | Dreyer et al. | 715/513 |
| 7,430,056 B2 * | 9/2008 | Rai et al. | 358/1.15 |
| 7,992,145 B2 * | 8/2011 | Emerson et al. | 718/100 |
| 2001/0043365 A1 * | 11/2001 | Kremer et al. | 358/1.16 |
| 2002/0149792 A1 * | 10/2002 | Gauthier et al. | 358/1.18 |
| 2003/0159114 A1 * | 8/2003 | Nishikawa et al. | 715/530 |
| 2003/0202213 A1 * | 10/2003 | Saito | 358/1.18 |
| 2006/0238800 A1 | 10/2006 | Czudak et al. | 358/1.15 |
| 2008/0304102 A1 * | 12/2008 | Saito | 358/1.15 |
| 2010/0253969 A1 * | 10/2010 | Morales | 358/1.15 |

OTHER PUBLICATIONS

VI Interpreter: Unmatched Speed for Composing Variable Pages; Free Flow Variable Information Suite, Xerox Variable Information Printing; Big Color Systems; http://bigcolorsystems.com/variableinfo.htm.

* cited by examiner

*Primary Examiner* — Twyler Haskins
*Assistant Examiner* — Dennis Dicker
(74) *Attorney, Agent, or Firm* — Kermit D. Lopel; Luis M. Ortiz; Melissa Asfahani

(57) ABSTRACT

Job tickets containing scoped instructions can control the processing of a PDL file to produce a data stream that is efficiently processed by a rendering device such as a raster image processor or printer. Job tickets contain instructions for processing a PDL file. Scoped instructions control processing of only those PDL file sections within a certain scope as specified on a per instruction basis.

18 Claims, 3 Drawing Sheets

ENHANCEMENTS TO VI RECORD JOB TICKETING AND PROCESSING

TECHNICAL FIELD

Embodiments are related to printing and more specifically to the processing of document descriptions expressed in the form of a page description language (PDL). Embodiments are also further related to the processing of variable instruction (VI) PDL document descriptions.

BACKGROUND

Variable-information (VI) printing is a form of on-demand printing in which elements such as text, graphics and images may be changed from one printed piece to the next without stopping or slowing down the printing process, using information from a database or external file. For example, a set of personalized letters, each with the same basic layout, can be printed with a different name and address on each letter. Variable data printing is often used for direct marketing, customer relationship management and advertising and invoicing.

In printing systems, print job ticketing can drive data-driven customization using digital technologies for VI printing. The VI printing techniques can allow for document personalization and range from varying text elements such as name and address, to varying graphics, images and page layouts for each recipient of such document. Personalized VI printing can be done, for example, by overprinting preprinted shells, or through a single pass using digital production color equipment. VI printing can enable, for example, the production of different versions of books and/or customized books within a single press run. VI printings can also provide customized information in the form of an address label, and personalized information or the like on the inside or outside of finished books. VI printing techniques can therefore greatly enhance the functionality and capabilities of printing systems.

A job ticket contains instructions for the printing of one or more specification files. The specification files can use a page description language, such as postscript, to describe a document or part of a document. When a VI PDL is used to describe the document, the values of certain data fields can be supplied by the job ticket or by another PDL file. A digital front end (DFE) can process the job ticket and submit data to a rendering device, such as a printer, that then produces the desired document. Those practiced in that art of variable instruction processing are familiar with PDLs, PDL files, and job tickets.

Most VI printing systems lack the capacity to completely control how a VI PDL is printed. This generally results from an unclear delineation of a VI data stream's structural hierarchy. In many cases, this lack of control is an inherent property of the PDL. For example Native mode variable intelligent personalized PostScript VIPP does not provide the ability to address individual records in a VI PDL. Other PDLs, in particular newer VI PDLs such as personalized print markup language (PPML), provide greater structural granularity within the VI PDL. The systems that understand these PDLs, however, do not take advantage of the level of control that newer PDLs potentially offer. If there is a need to finely control how a PDL is printed, the onus is placed on the VI emitter to generate the required VI PDL. Although workable, the VI authoring application must understand production requirements when creating PDLs. Production flexibility is therefore eliminated and any change in production requires problematic re-generation of a potentially large VI PDL.

A need therefore exists for improved methods and systems for finely controlling the processing of job ticketed PDL files.

BRIEF SUMMARY

It is therefore an aspect of the embodiments to obtain a job ticket comprising a multiplicity of scoped instructions and a multiplicity of scope designations. Scoped instructions have a scope that is determined by the scope designations associated with the scoped instruction.

It is also an aspect of the embodiments to obtain a page description language (PDL) file comprising a multiplicity of variable instruction (VI) records. Each VI record describes one or more pages of a document. The scope designations specify VI records and, as such, the scope of each scoped instruction covers one or more VI records. The widest possible scope is the entire PDL file whereas the smallest possible scope is a single VI record. Those practiced in the art of VI processing are familiar with VI records.

It is a further aspect of the embodiments to apply each scoped instructions to those VI records within its scope.

It is a yet further aspect of the embodiments to print a document that is in compliance with the job ticket and that is specified by the PDL file.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention

DETAILED DESCRIPTION OF THE INVENTION

The particular values and configurations discussed in these non-limiting examples can be varied and are cited merely to illustrate embodiments and are not intended to limit the scope of the invention.

Job tickets containing scoped instructions can control the processing of a PDL file to produce a data stream that is efficiently processed by a rendering device such as a raster image processor or printer. Job tickets contain instructions for processing a PDL file. A scoped instructions controls processing of only those PDL file sections within a certain scope. Scope can be specified on a per instruction basis.

Figure 1:
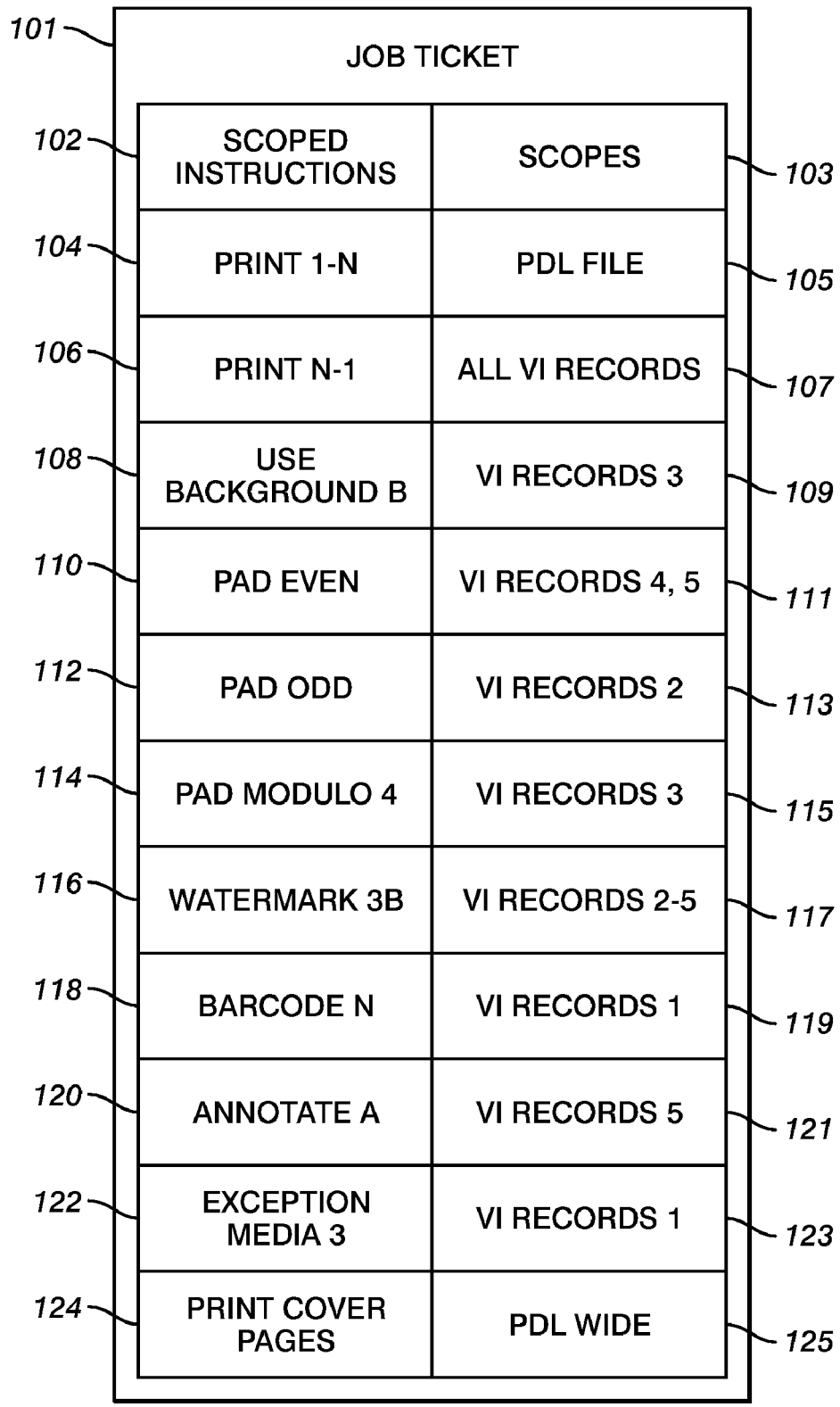
FIG. 1 illustrates a job ticket in accordance with aspects of the embodiments.

FIG. 1 illustrates a job ticket (JT) 101 in accordance with aspects of the embodiments. The job ticket 101 contains scoped instructions 102 associated with scopes 103. The job ticket 101 can also contain non-scoped instructions such as those used in the prior art. The "Print 1-N" scoped instruction 104 has PDL file scope 105 as indicated by the "PDL File" scope 105 designator. As such, the PDL file scope 105 is printed in order starting with the first VI record and proceeding to the last VI record. The "Print N-1" scoped instruction 106 has a scope covering all VI records 107. As such, the pages in each VI record are printed in reverse order proceeding from the last page to the first page. The "All VI records" scope 107 is functionally equivalent to a list containing all the VI records or a range specification covering all the VI records. The smaller scope "All VI Records" 107 can override the wider scope "PDL File" scope 105. As such, "Print 1-N" 104 scoped instruction causes the VI records to be printed 1-N, meaning the first VI record is printed, then the second, and so on. The "Print N-1" scoped instructions 106, having smaller scope, causes the pages within each VI record to be printed N-1. The first page to be printed is therefore the last page of the first record and the last page to be printed is the first page of the last record.

The "Use Background B" scoped instruction 108 has a scope covering VI record 3 109 as indicated by the "VI Records 3" 109 scope designator. As such, the pages of VI record 3 109 will be printed over a background specified as "B". Note that if a PDL Wide 125 background was chosen by a "Use Background A" scoped instruction 102 having "PDL File" scope 105, then every page in the document, except for those pages in VI record 3 109, would be printed with a background specified as "A". The smaller scoped instruction "Use Background B" 108 would override the more widely scoped instruction 102.

The "Pad Even" scoped instruction 110 has a scope covering VI records 4, 5 111. The scope designator "VI Records 4, 5" 111 is in list form. As such, an even number of pages will be produced by processing and printing VI record 4 and an even number of pages will also be produced by processing and printing VI record 5.

The "Pad Odd" scoped instruction 112 has a scope covering VI record 2 113. As such, an odd number of pages are produced by processing and printing VI record 2 113.

The "Pad Modulo 4" scoped instruction 114 has a scope covering VI record 3 115. As such, the number of pages produced by processing and printing VI record 3 115 will be a multiple of 4.

The "Watermark 3b" scoped instruction 116 has a scope covering VI records 2-5 117. The "VI Records 2-5" 117 scope designator is formatted as a range with "2-5" indicating 2 through 5 inclusive. As such, the pages produced by processing and printing VI records 2-5 117 will have watermark 3b 116.

The "Barcode N" scoped instruction 118 has a scope covering VI record 1 119. As such, the pages produced by processing and printing VI record 1 119 will be marked with the specified barcode.

The "Annotate A" scoped instruction 120 has a scope covering VI record 5 121. As such, the pages produced by processing and printing VI record 5 121 will be annotated with the specified annotation.

The "Exception Media 3" scoped instruction 122 has a scope covering VI record 1 123. As such, the pages produced by processing and printing VI record 1 123 will be on media type 3. A media type specifies a certain kind of media that can be printed upon such as paper having a certain weight, color, and coating. The Exception Media 3 scoped instruction 122 is an exception because it can lead to a requirement for special handling.

The "Print Cover Pages" scoped instruction 124 has a PDL wide scope 125. As such, cover pages are produced. The PDL wide scope 125 is such that the covers can be printed first and positioned such that they fold around the subsequently printed VI records.

Figure 2:
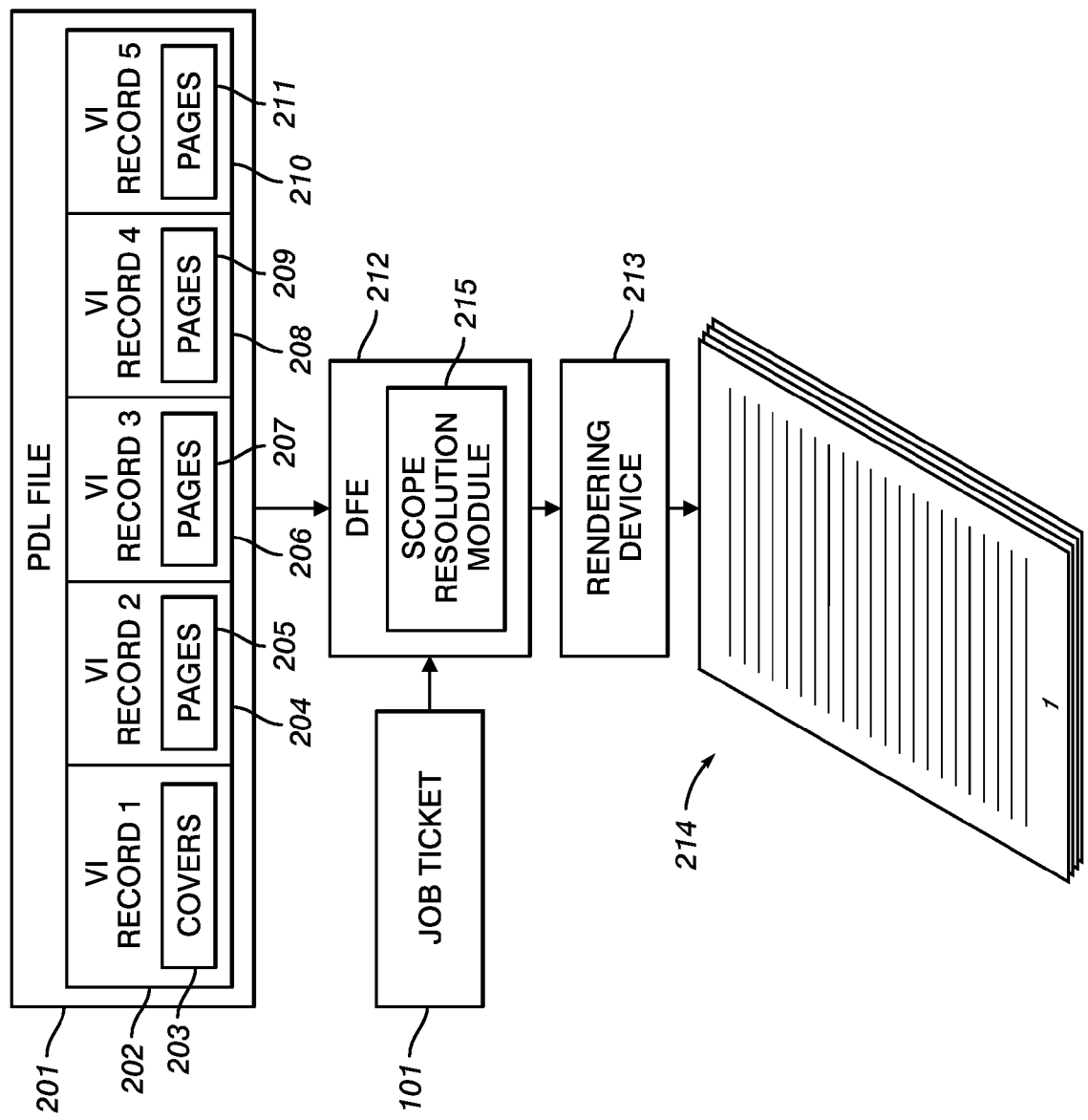
FIG. 2 illustrates a document produced in compliance with a job ticket and that is specified by the PDL file in accordance with aspects of the embodiments.

FIG. 2 illustrates a document 214 produced in compliance with a job ticket 101 and that is specified by the PDL file 201 in accordance with aspects of the embodiments. The PDL file 201 contains five VI records VI record 1 202 specifies the covers 203. The other VI records 204, 206, 208, 210 specify the pages 205, 207, 209, 211 of various sections of the document 214. The PDL file 201 and job ticket 101 can be processed by a digital front end (DFE) 212 and printed by a rendering device 213.

Figure 3:
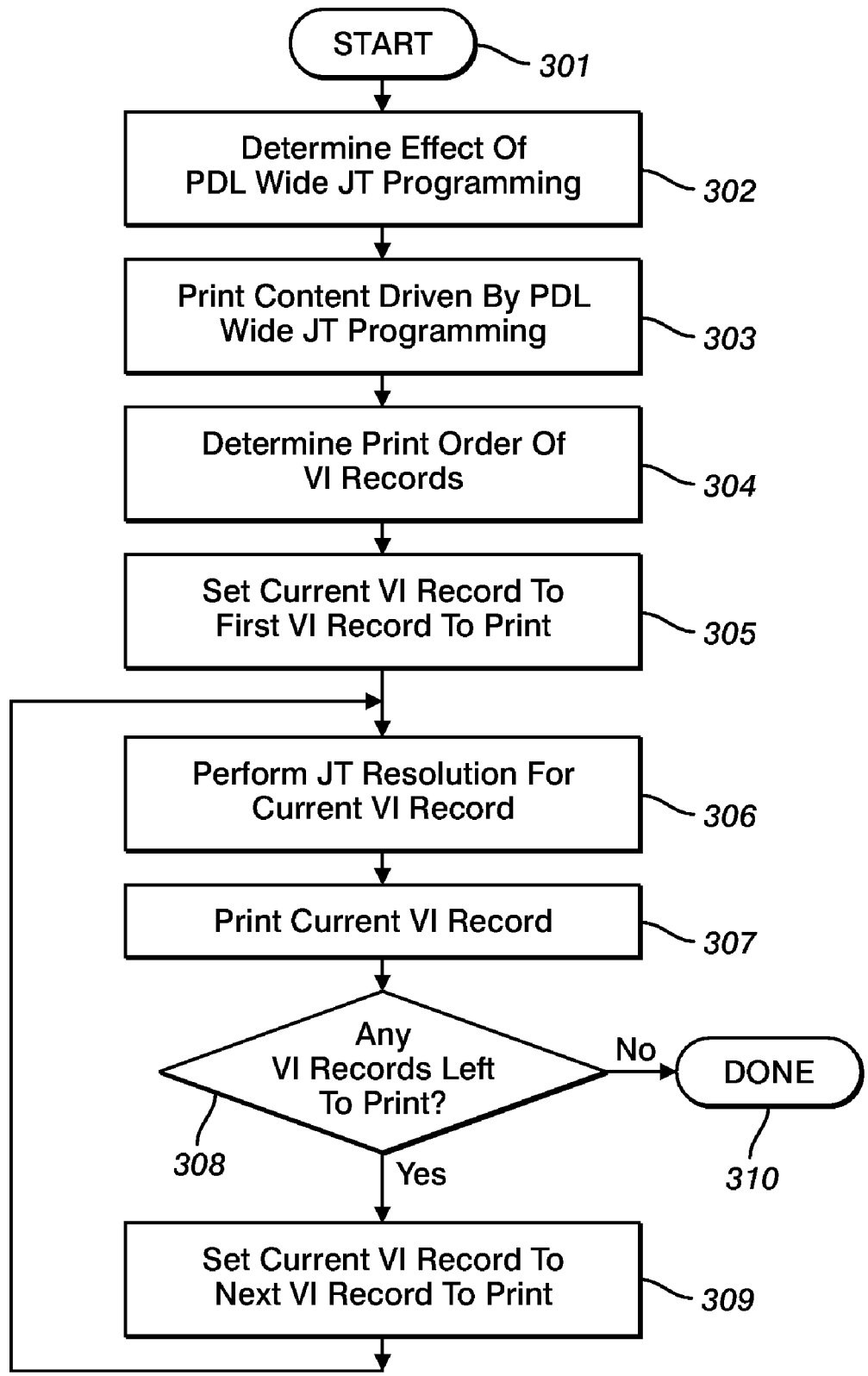
FIG. 3 illustrates a high level flow diagram of processing a job ticket in accordance with aspects of the embodiments.

FIG. 3 illustrates a high level flow diagram of processing a job ticket 101 and PDL file 201 in accordance with aspects of the embodiments. After the start 301, the effects of PDL wide JT programming 302 are determined. Instructions having PDL wide scope make up the PDL wide JT programming 302. Content driven by the PDL wide JT programming 303 is then printed. The covers can be an example of content driven by PDL wide JT programming 303. Next, the order of printing VI records 304 is determined and the first to print VI record is set as the current VI record 305.

JT resolution for the current VI record 306 is then performed. Some VI records are affected by numerous scoped instructions and the JT resolution step applies all of the applicable instructions to the current VI record. The current VI record 306 is then printed 307. If there are no more VI records left to print 308, then the process is done 310. Otherwise, the next VI record to print is set to the current VI record 309 and the process loops back the JT resolution for the current VI record 306 step.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variables routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for variable information printing comprising:
 a job ticket comprising a scoped instruction and an associated variable information record wherein said variable information record describes one or more pages of a document wherein text, graphics, and images may be changed from one or more pages of said document without stopping or slowing down a printing process;
 a page description language file comprising a multiplicity of said variable information records;
 a scope designation that specifies at least one of said multiplicity of said variable information records for variable information printing;
 a digital front end that submits content with a page description language file-wide scope included in said scored instruction to a rendering device before submitting content having less than page description language file-wide scope to said rendering device, determines an effect of said scope of said page description language in said scoped instruction, determines a print order of said variable information record, processes said print order of said variable information record by determining said scoped instruction to apply to said variable information record, and applies said scoped instruction to said variable information record for variable information printing; and a rendering device that prints said document with an applied said scoped instruction specified by said page description language file to those pages within a scope of said scoped instruction in compliance with said job ticket.

2. The system of claim 1 wherein said scoped instruction comprises a command to print in order from first to last.

3. The system of claim 1 wherein said scoped instruction comprises a command to print in order from last to first.

4. The system of claim 1 wherein said scoped instruction comprises a command to print over a background.

5. The system of claim 1 wherein said scoped instruction comprises a watermark command.

6. The system of claim 1 wherein said scoped instruction comprises a barcode command.

7. The system of claim 1 wherein said scoped instruction comprises an annotate command.

8. The system of claim 1 wherein said scoped instruction comprises a command to print in order from first to last, a command to print in order from last to first, a command to print over a background, a watermark command, a barcode command, and an annotate command.

9. A system for variable information printing comprising:
a job ticket comprising a scoped instruction and an associated variable information record such that wherein said variable information record describes one or more pages of a document wherein text, graphics and images may be changed from one or more pages of said document without stopping or slowing down a printing process;
a page description language file comprising a multiplicity of said variable information records;
a scope designation that specifies at least one of said multiplicity of said variable information records for variable information printing and a scope of said page description language file in said scoped instruction; and
a digital front end that determines an effect of said scope on said page description language file included in said scoped instruction, submits content with a page description language file-wide scope included in said scoped instruction to a rendering device before submitting content having less than page description language file-wide scope to said rendering device, determines an effect of said scope of said page description language in said scoped instruction, determines a print order of said variable information record, processes said print order of said variable information record by determining said scoped instruction to apply to said variable information record, and applies said scoped instruction to said variable information record for variable information printing.

10. The system of claim 9 wherein said scoped instruction comprises a command to print in order from first to last.

11. The system of claim 9 wherein said scoped instruction comprises a command to print in order from last to first.

12. The system of claim 9 wherein said scoped instruction comprises a command to print over a background.

13. The system of claim 9 wherein said scoped instruction comprises a watermark command.

14. The system of claim 9 wherein said scoped instruction comprises a barcode command.

15. The system of claim 9 wherein:
said variable information record specifies a cover page for said document; and
said scoped instruction has a page description language file-wide scope comprising a command to print said cover page for said document.

16. The system of claim 9 wherein said scoped instruction comprises a command to print in order from first to last, a command to print in order from last to first, a command to print over a background, a watermark command, a barcode command, an annotate command, and a command with a page description language file-wide scope to print a cover page for said document.

17. A method for variable information printing comprising:
obtaining a job ticket comprising a scoped instruction and a means for specifying a scope for said scoped instruction;
obtaining a page description language file comprising a variable information record comprising at least one page description wherein said variable information record describes one or more pages of a document wherein text, graphics and images may be changed from one or more pages of said document without stopping or slowing down a printing process;
submitting, via a digital front end, content with a page description language file-wide score included in said scored instruction to a rendering device before submitting content having less than page description language file-wide scope to said rendering device;
determining, via said digital front end, an effect of said scope of said page description language in said scored instruction;
determining, via said digital front end, a print order of said variable information record;
processing, via said digital front end, said print order of said variable information record by determining said scored instruction to apply to said variable information record;
applying, via said digital front end, said scoped instruction to said variable information record for variable information printing; and
processing said variable information record wherein processing said variable information record comprises:
applying said scoped instruction to said variable information record; and
printing said variable information record.

18. The method of claim 17 further comprising:
determining a print order of said variable information record wherein said variable information record is processed in said print order.

* * * * *